United States Patent
Tamai et al.

[11] Patent Number: 5,268,447
[45] Date of Patent: Dec. 7, 1993

[54] READILY PROCESSABLE POLYIMIDE AND PREPARATION PROCESS OF SAME

[75] Inventors: Shoji Tamai; Masahiro Ohta; Akihiro Yamaguchi, all of Kanagawa, Japan

[73] Assignee: Mitsui Toatsu Chemicals, Inc., Tokyo, Japan

[21] Appl. No.: 914,015

[22] Filed: Jul. 15, 1992

Related U.S. Application Data

[63] Continuation of Ser. No. 703,871, May 22, 1991, abandoned.

[30] Foreign Application Priority Data

| Jun. 1, 1990 | [JP] | Japan | 2-141274 |
| Jun. 27, 1990 | [JP] | Japan | 2-166634 |
| Jun. 27, 1990 | [JP] | Japan | 2-166637 |
| Jul. 18, 1990 | [JP] | Japan | 2-187885 |
| Jul. 26, 1990 | [JP] | Japan | 2-196374 |

[51] Int. Cl.$^5$ .................................. C08G 69/26
[52] U.S. Cl. ..................... 528/353; 528/125; 528/126; 528/128; 528/172; 528/183; 528/184; 528/185; 528/187; 528/188; 528/229
[58] Field of Search .......... 528/125, 126, 128, 172, 528/183, 184, 185, 187, 188, 229, 353

[56] References Cited

U.S. PATENT DOCUMENTS

| 3,959,350 | 5/1976 | Rogers . | |
| 4,048,147 | 9/1977 | Arakawa et al. | 526/202 |
| 4,876,330 | 10/1989 | Higoshi et al. | 528/353 |
| 4,910,288 | 3/1990 | Dellacoletta . | |
| 4,978,692 | 12/1990 | Ezawa et al. | 521/185 |
| 4,994,544 | 2/1991 | Nagahiro et al. | 528/125 |

FOREIGN PATENT DOCUMENTS

| 200204 | 11/1986 | European Pat. Off. . |
| 276922 | 8/1988 | European Pat. Off. . |
| 283835 | 9/1988 | European Pat. Off. . |
| 323912 | 7/1989 | European Pat. Off. . |
| 350203 | 1/1990 | European Pat. Off. . |
| 1-96221 | 4/1989 | Japan . |

*Primary Examiner*—John Kight, III
*Assistant Examiner*—Shelley A. Dodson
*Attorney, Agent, or Firm*—Burns, Doane, Swecker & Mathis

[57] ABSTRACT

A readily melt processable polyimide obtained by reacting diamine represented by the formula:

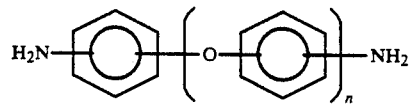

wherein n is an integer of 1 or 2, with 3,3',4,4'-diphenylethertetracarboxylic dianhydride and/or 4,4'-(p-phenylenedioxy)diphthalic dianhydride or a mixture of these tetracarboxylic acid dianhydrides and pyromellitic dianhydride in the presence of phthalic anhydride.

10 Claims, 5 Drawing Sheets

READILY PROCESSABLE POLYIMIDE AND PREPARATION PROCESS OF SAME

This application is a continuation of application Ser. No. 07/703,871, filed May 22, 1991, now abandoned.

BACKGROUND OF THE INVENTION

1. Field of the Invention

The present invention relates to a polyimide used for melt-processing, and more particularly relates to a polyimide having excellent processability, and to a process for preparing the same.

2. Description of the Related Art

Polyimide obtained by reacting a tetracarboxylic dianhydride with a diamine has very high heat-resistance and is additionally excellent in mechanical strength, dimensional stability, flame retardancy and electrical insulation. On account of such favorable performance, polyimide has been conventionally used in the field of electric and electronic apparatus, space and aeronautic equipment and transportation machinery. Thus, polyimide is a functional resin which is expected to be widely used in fields where heat resistance is required. New fields of use have required diversified performance and application methods. Various kinds of polyimide having excellent characteristics have been developed to meet these demands.

Some of the polyimides, however, have no definite glass transition temperature, though excellent in heat resistance. Consequently, the polyimide must be processed by such means as sinter molding, when it is used as a molding material. Other kinds of polyimides are soluble in solvents such as halogenated hydrocarbons, and though excellent in processability, have a disadvantage in solvent resistance. Thus, conventionally developed polyimides have both merits and drawbacks in its performance.

Conventionally known polyimides have been commonly difficult to process. These kinds of polyimide are thermosetting resins. Hence it is difficult to apply melt-processing methods which can operate with ease and a specialized processing method such as sintering must be employed.

For example, polyimide prepared from pyromellitic dianhydride and 4,4'-diaminodiphenyl ether and having a fundamental skeleton of the following formula (I):

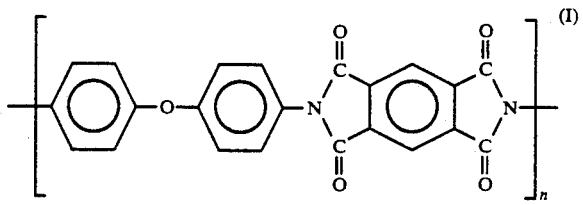

has no distinct glass transition temperature and is difficult to process as a molding material, though excellent in heat resistance. It has been well known that this polyimide must be processed by means of sintering.

Another polyimide obtained by reacting pyromellitic dianhydride with 1,4-bis(4-aminophenoxy)benzene has been known for a long time as disclosed in SU-188,005. The polyimide, however, exhibits no melt-flowability at all at 450° C. and is quite difficult to process in the molten state.

Further, polyimide prepared from 3,3',4,4'-diphenylethertetracarboxylic dianhydride and 1,4-bis(4-aminophenoxy)benzene has been disclosed in U.S. Pat. No. 4,855,391 and EP 283,853. However, no description has been found at all on the melt-flowability and injection molding of the polyimide.

Therefore, in order to extend utilization of polyimides in fields where the excellent properties of polyimide can be applied, particularly in the high technology field, it is extremely important to discover polyimide having a specific structure which can be melt processed while maintaining the various excellent characteristics of polyimide.

SUMMARY OF THE INVENTION

An object of the present invention is to provide polyimide having excellent processability, good chemical resistance and outstanding transparency in addition to an excellent heat resistance which is an essential characteristic of polyimide.

The present inventors have carried out an intensive investigation in order to achieve the above object and have completed the present invention.

Accordingly, one aspect of the present invention is a melt-processable polyimide obtained by blocking the chain end of a polymer molecule with a divalent aromatic group derived from phthalic anhydride, which comprises essentially consisting of a recurring structural unit represented by the formula (II):

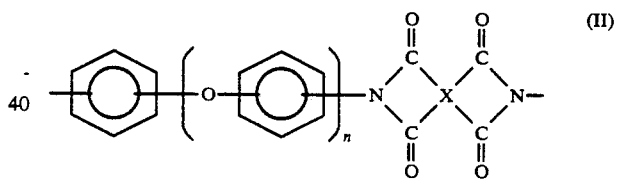

wherein X is a tetravalent group of

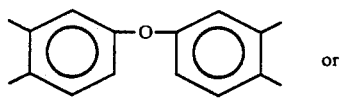

or

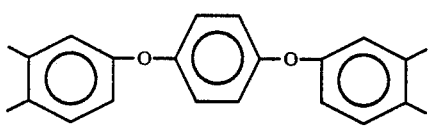

and n is an integer of 1 or 2; or a melt processable polyimide comprising blocking the chain end of a polymer molecule with a divalent aromatic group derived from phthalic anhydride and essentially consisting of 2 or more recurring structural units which are a mixture of a recurring structural unit represented by the formula (III) and/or a recurring structural unit represented by the formula (IV) with a recurring structural unit represented by the formula (V) and/or a recurring structural unit represented by the formula (VI):

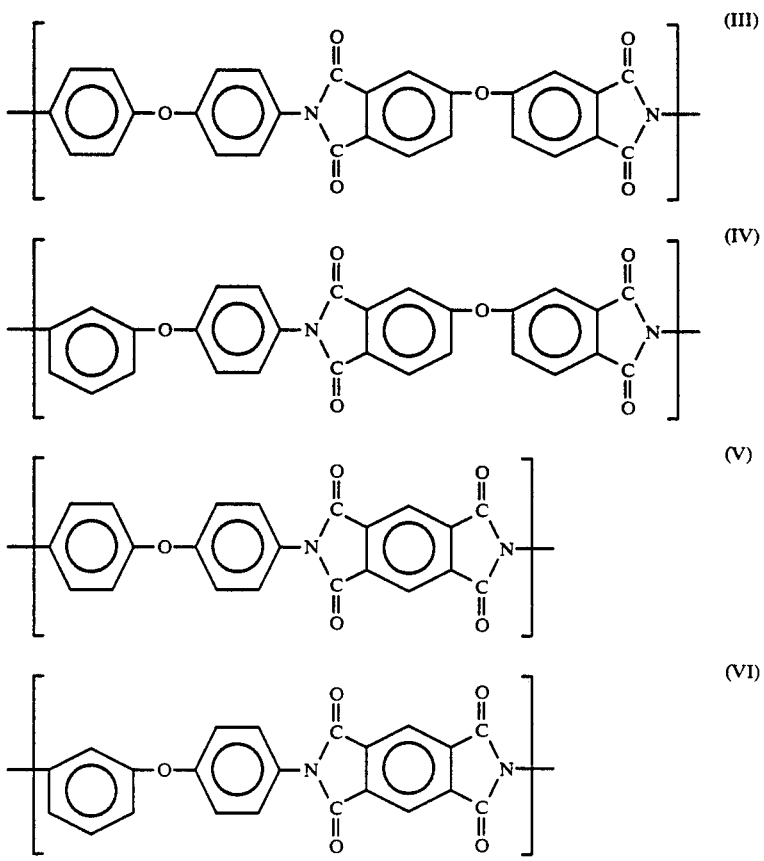

Other aspects of the present invention are a readily processable polyimide and a preparation process of the same by reacting a diamine with a tetracarboxylic acid dianhydride and thermally or chemically imidizing the resulting polyamic acid, comprising:

(a) using a diamine represented by the formula (VII)

(VII)

wherein n is an integer of 1 or 2, that is, a single compound or a mixture of compounds selected from the diamine having the formula (VIII) and the formula (IX):

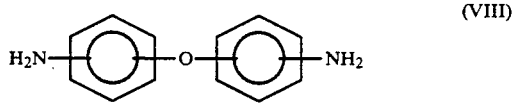

(VIII)

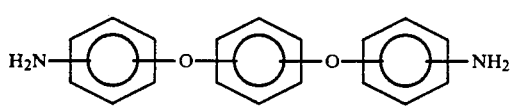

(IX)

(b) using a tetracarboxylic acid dianhydride selected from 3,3',4,4'-diphenylethertetracarboxylic acid dianhydride and 4,4'-(p-phenylenedioxy)diphthalic dianhydride, and (c) conducting the reaction in the presence of phthalic anhydride in an amount of from 0.001 to 1.0 mole per mole of the diamine having the formula (VIII) and/or the formula (IX).

Further aspects of the invention are a readily processable polyimide and a process for preparing the same by reacting a diamine with a tetracarboxylic acid dianhydride and thermally or chemically imidizing the resulting polyamic acid, comprising:

(a) using a single diamine or a mixture of the diamine selected from 4,4'-diaminodiphenyl ether and 3,4'-diaminodiphenyl ether, (b) using a tetracarboxylic acid dianhydride mixture obtained by mixing pyromellitic dianhydride with 3,3',4,4'-diphenylethertetracarboxylic acid dianhydride and/or 4,4'-(p-phenylenedioxy)diphthalic dianhydride, and (c) conducting the reaction in the presence of phthalic anhydride in an amount of from 0.001 to 1.0 mole per mole of the diamine.

Polyimide of the present invention has excellent heat and chemical resistance, good transparency, outstanding processability due to thermoplasticity and can be melt-processed.

Thus the polyimide is very useful for space and aeronautic equipment, electric and electronic apparatus and heat resistant adhesives.

DETAILED DESCRIPTION OF THE INVENTION

Figure 1:
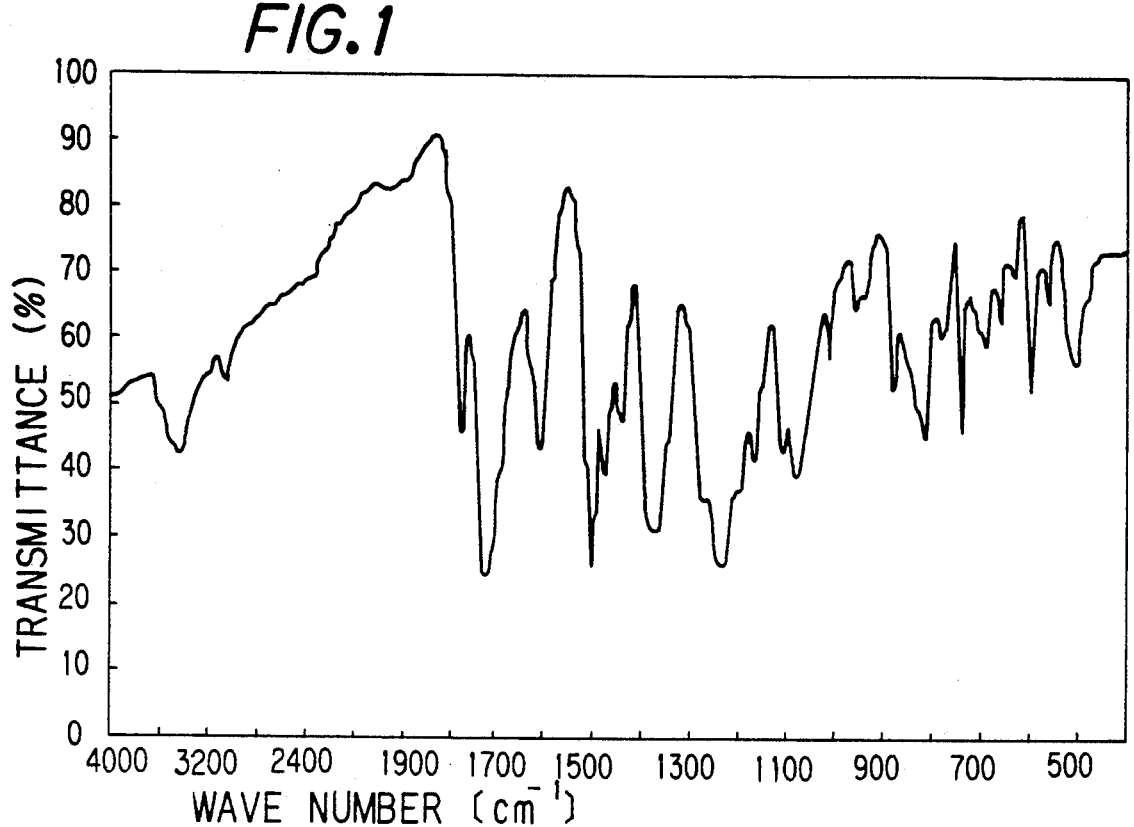
FIGS. 1, 3, 4, 5, 6, 7 and 9 illustrate IR absorption spectrum of polyimide powder respectively obtained in Examples 1, 2, 5, 9, 10, 16 and 20 of the invention.

The polyimide of the present invention is blocked the chain end of a polymer molecule with a divalent aromatic group derived from phthalic anhydride of the formula (X):

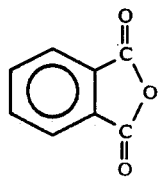

and essentially consists of a recurring structural unit represented by the formula (II):

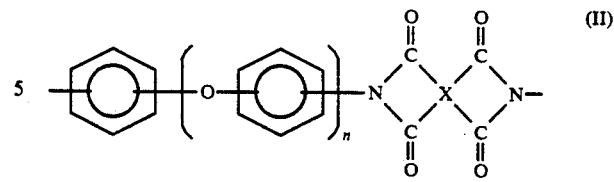

wherein X is a tetravalent group of

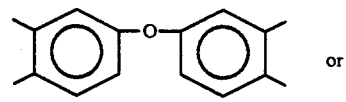 or

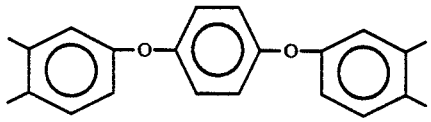

and n is an integer of 1 or 2.

Exemplary polyimide of the invention essentially consists of a recurring structural unit selected from:

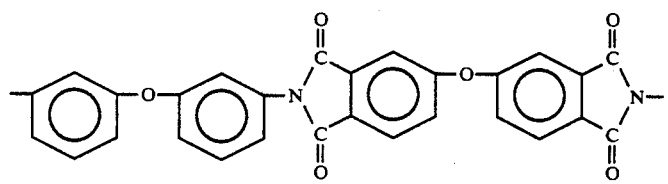

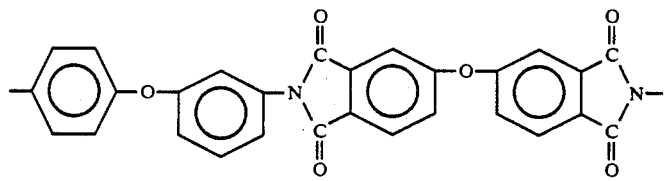

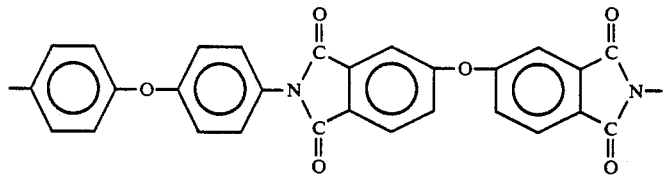

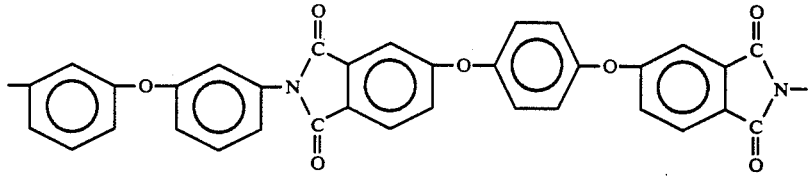

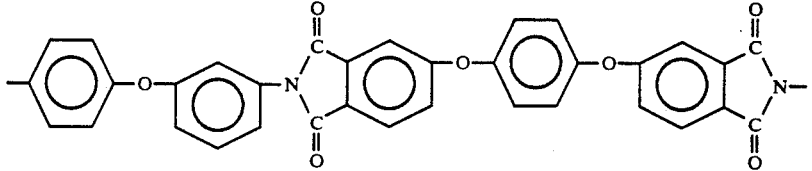

-continued
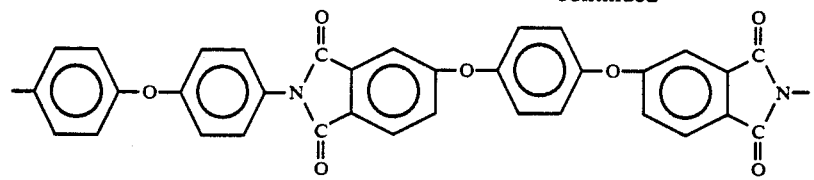
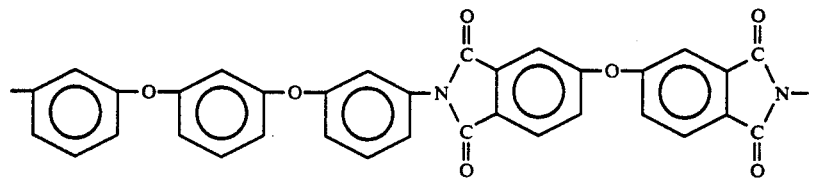
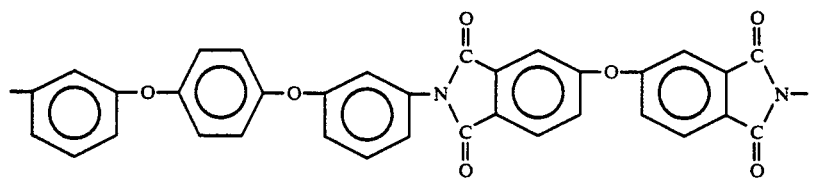
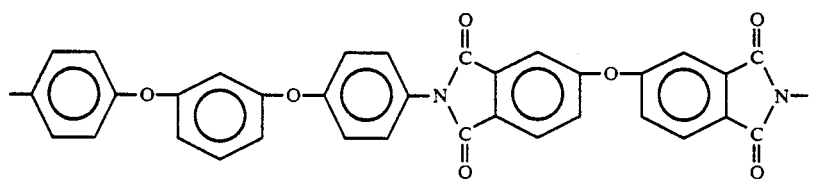
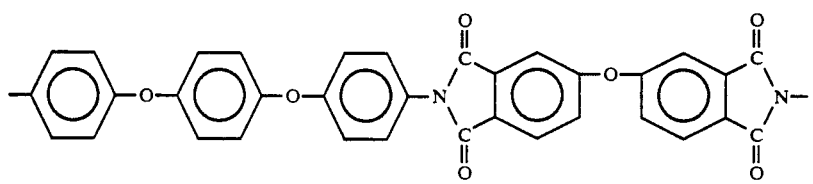
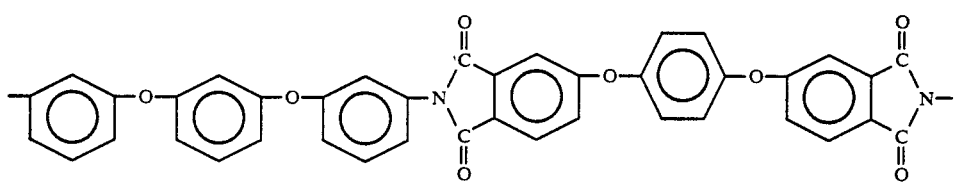
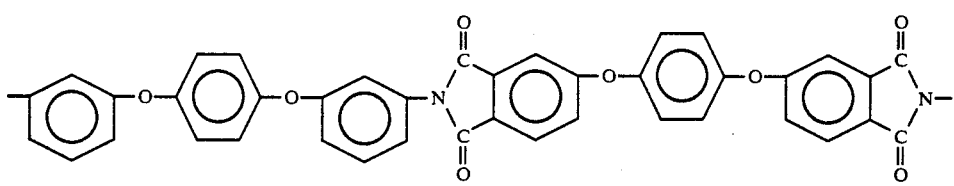
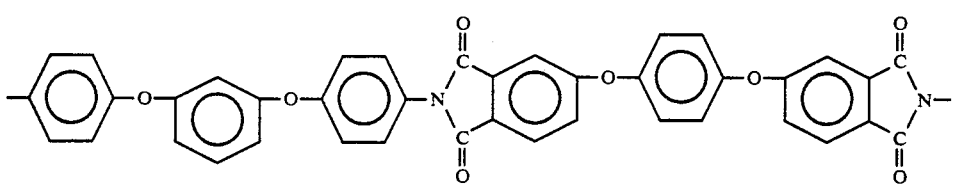
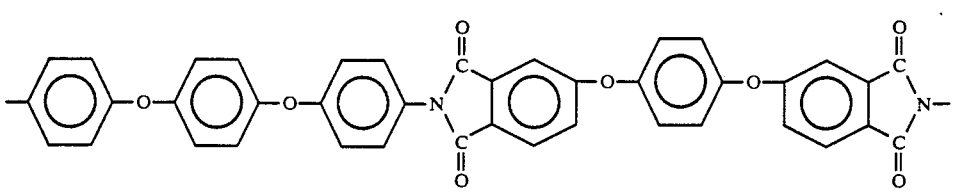

Another polyimide of the invention is blocked on the end of the polymer molecule with a divalent aromatic group derived from phthalic anhydride of the formula (X):

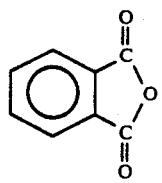
(X)

and essentially consisting of 2 or more recurring structural units which are a mixture of a recurring structural unit represented by the formula (III) and/or a recurring structural unit represented by the formula (IV) with a recurring structural unit represented by the formula (V) and/or a recurring structural unit represented by the formula (VI):

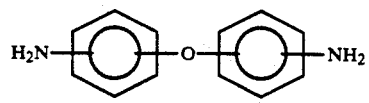
(VIII)

such as 4,4'-diaminodiphenyl ether, 3,3'-diaminodiphenyl ether, 2,2'-diaminodiphenyl ether, 2,3'-diaminodiphenyl ether, 2,4'-diaminodiphenyl ether and 3,4'-diaminodiphenyl ether; and bis(aminophenoxy)benzene represented by the formula (IX):

(IX)

such as 1,3-bis(3-aminophenoxy)benzene, 1,3-bis(4-aminophenoxy)benzene, 1,4-bis(3-aminophenoxy)ben-

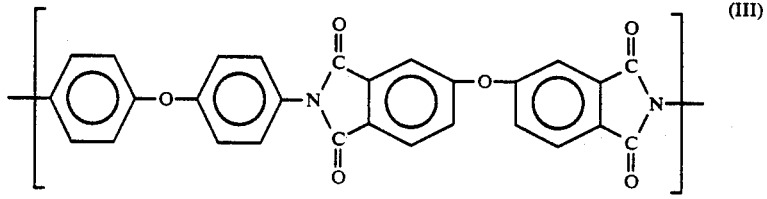
(III)

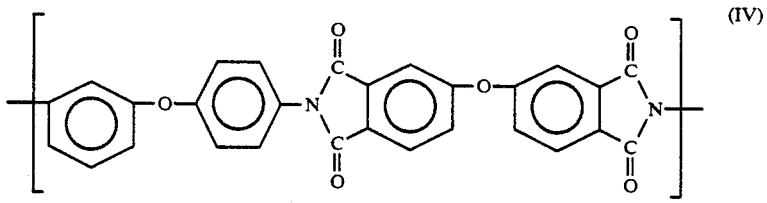
(IV)

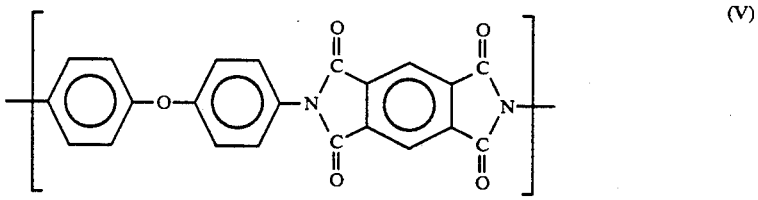
(V)

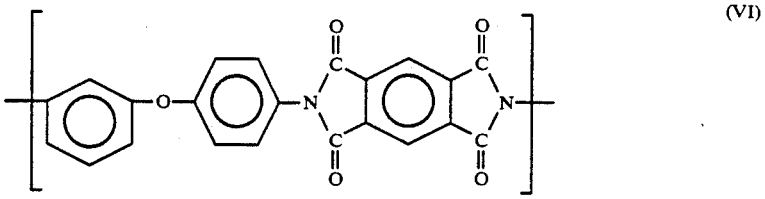
(VI)

(The polyimide will hereinafter be referred to as copolyimide).

The polyimide of the invention can be prepared by reacting a tetracarboxylic acid dianhydride with a diamine in the presence of phthalic anhydride and thermally or chemically imidizing the resulting polyamic acid having the end of polymer chain blocked with a divalent group derived from phthalic anhydride.

The diamines used in the invention include, for example, diaminodiphenyl ethers represented by the formula (VIII):

zene and 1,4-bis(4-aminophenoxy)benzene.

Particularly in the preparation of copolyimide 4,4'-diaminodiphenyl ether and 3,4'-diaminodiphenyl ether are used singly or as a mixture.

The tetracarboxylic acid dianhydride component used in the invention is 3,3',4,4'-diphenylethertetracarboxylic dianhydride of the formula (XI) or 4,4'-bis(p-phenylenedioxy)diphthalic dianhydride of the formula (XII):

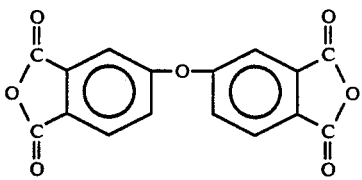

(XI)

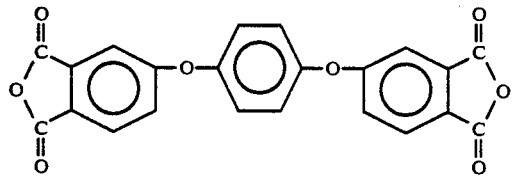

(XII)

Particularly in the preparation of copolyimide, these tetracarboxylic dianhydrides are reacted in the presence of pyromellitic dianhydride of the formula (XIII):

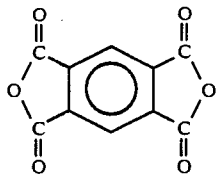

(XIII)

The polyimide of the invention is prepared by using the above diamines. These diamines can also be used as a mixture with other diamines as long as there is no significant adverse effect on the good properties of the polyimide.

Other diamines which can be used as a mixture include, for example, m-phenylenediamine, o-phenylenediamine, p-phenylenediamine, m-aminobenzylamine, p-aminobenzylamine, bis(3-aminophenyl)ether, (3-aminophenyl)(4-aminophenyl) ether, bis(3-aminophenyl)sulfide, (3-aminophenyl)(4-aminophenyl) sulfide, bis(4-aminophenyl)sulfide, bis(3-aminophenyl) sulfoxide, (3-aminophenyl)(4-aminophenyl) sulfoxide, bis(4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis [4-(3-aminophenoxy)phenyl] methane, bis [4-(4-aminophenoxy)phenyl] methane, 1,1-bis [4-(3-aminophenoxy)phenyl] ethane, 1,1-bis [4-(4-aminophenoxy)phenyl] ethane, 1,2-bis [4-(3-aminophenoxy)phenyl] ethane, 1,2-bis [4-(4-aminophenoxy)phenyl] ethane, 2,2-bis [4-(3-aminophenoxy)phenyl] propane, 2,2-bis [4-(4-aminophenoxy)phenyl] propane, 2,2-bis [4-(3 aminophenoxy)phenyl] butane, 2,2-bis [4-(3-aminophenoxy)phenyl] -1,1,1,3,3,3-hexafluoropropane, 2,2-bis [4-(4-aminophenoxy)phenyl] -1,1,1,3,3,3-hexafluoropropane, 1,3 bis(3-aminophenoxy)benzene, 1,3 bis(4-aminophenoxy)benzene, 1,4-bis(3-aminophenoxy)benzene, 1,4-bis(4-aminophenoxy)benzene, 4,4'-bis(3-aminophenoxy)biphenyl, 4,4'-bis(4-aminophenoxy)biphenyl, bis [4-(3-aminophenoxy)phenyl] ketone, bis [4-(4-aminophenoxy)phenyl] ketone, bis [4-(3-aminophenoxy)phenyl] sulfide, bis [4-(4-aminophenoxy)phenyl] sulfide, bis [4-(3-aminophenoxy)phenyl] sulfoxide, bis [4-(4-aminophenoxy)phenyl] sulfoxide, bis [4-(3-aminophenoxy)phenyl] sulfone, bis [4-(4-aminophenoxy)phenyl] sulfone, bis [4-(3-aminophenoxy)phenyl] ether, bis [4-(4-aminophenoxy)phenyl] ether, 1,4-bis [4-(3-aminophenoxy)benzoyl] benzene, 1,3-bis [4-(3-aminophenoxy)benzoyl] benzene, 4,4'-bis [3-(4-aminophenoxy)benzoyl] diphenyl ether, 4,4'-bis [3-(3-aminophenoxy)benzoyl] diphenyl ether, 4,4'-bis [4-(4-amino-$\alpha,\alpha$-dimethylbenzyl)phenoxy] benzophenone, 4,4'-bis [4-(4-amino-$\alpha,\alpha$-dimethylbenzyl)phenoxy] diphenyl sulfone, bis [4- {4-(4-aminophenoxy)phenoxy} phenyl] sulfone, 1,4-bis [4-(4-aminophenoxy)-$\alpha,\alpha$-dimethylbenzyl] benzene, 1,3-bis [4-(4-aminophenoxy)-$\alpha,\alpha$-dimethylbenzyl] benzene. These diamines are used singly or as a mixture.

A portion of the phthalic anhydride illustrated by the formula(X) in the invention can be replaced by other dicarboxylic acid dianhydrides as long as there is no significant adverse effect on the good properties of the polyimide.

Exemplary dicarboxylic acid dianhydrides which can replace a portion of the phthalic anhydride include 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride.

Phthalic anhydride of the formula (X) is used in an amount of from 0.001 to 1.0 mole per mole of the sum of the diamine compounds used. An amount less than 0.001 mole leads to viscosity increase in high temperature processing and impairs meltprocessability. On the other hand, an amount exceeding 1.0 mole causes reduction of mechanical strength. Preferred amounts for use are in the range of from 0.01 to 0.5 mole.

In the preparation of copolyimide of the invention, pyromellitic dianhydride is used in an amount of from 0.05 to 1.0 mole, preferably from 0.1 to 0.5 mole per mole of 3,3',4,4'-diphenylethertetracarboxylic dianhydride. An amount less than 0.05 mole does not improve heat resistance. On the other hand, an amount exceeding 1.0 mole leads to remarkable increase in melt viscosity in high temperature processing and makes injection molding or extrusion molding impossible.

In the preparation process of the invention, the reaction is preferably carried out in an organic solvent.

Exemplary solvents which can be used include; N,N-dimethylformamide, N,N-dimethylacetamide, N,N-diethylacetamide, N,N-dimethylmethoxyacetamide, N-methyl 2 pyrrolidone, 1,3-dimethyl-2-imidazolidinone, N methylcaprolactam, 1,2-dimethoxyethane-bis(2-methoxyethyl)ether, 1,2-bis(2-methoxyethoxy)ethane, bis [2-(2-methoxyethoxy)ethyl] ether, tetrahydrofuran, 1,3-dioxane, 1,4 dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These organic solvents can be used singly or as a mixture.

In the practice of the invention, the diamine, the tetracarboxylic acid dianhydride and the phthalic anhydride are added to the organic solvent and the reaction is carried out. Any of the following addition methods can be conducted in the reaction.

(a) After reacting diamine with tetracarboxylic acid dianhydride, phthalic anhydride is added and the reaction is continued.
(b) After reacting diamine with phthalic anhydride, tetracarboxylic acid dianhydride is added and the reaction is continued.
(c) Diamine, tetracarboxylic acid dianhydride and phthalic anhydride are added at the same time and the reaction is carried out.

The reaction temperature is usually 250° C. or less, preferably 50° C. or less.

No particular limitation is imposed on the reaction pressure. The reaction can be sufficiently carried out under atmospheric pressure. The reaction time differs depending upon the kind of solvent and reaction temperature. A reaction time of 4 to 24 hours is usually sufficient.

The resultant polyamic acid is converted to polyimide having recurring structural units corresponding to the polyamic acid by thermally imidizing at 100 to 400° C. or chemically imidizing with acetic anhydride and other imidizing agents.

Alternatively, polyimide can also be prepared by suspending or dissolving diamine, tetracarboxylic acid dianhydride and phthalic anhydride in an organic solvent and then by heating to carry out formation of the polyamic acid precursor and imidization at the same time.

Films or powders of polyimide can be obtained by conventionally known methods.

Every polyimide thus obtained is a aromatic polyetherimide having imide bonds and ether bonds in a polymer molecule. Glass transition temperature of the polyimide is in the temperature range of from 150 to 270° C. and the polyimide can be used for melt-processing.

The melt viscosity of the polyimide can be set on 30,000 poise or less at a shear rate of $1,000 \text{ sec}^{-1}$ at the temperature range of 300 to 450° C. Therefore, the polyimide is useful as the material for extrusion molding and injection molding. Molding conditions are dependent upon the structure and molecular weight of the polyimide used, particularly, when the polyimide is applied as the material for injection molding, the molding is usually carried out in the temperature range of from 300 to 450° C. and injection pressure range of from 50 to 2,000 kg/cm$^2$ by means of conventional processing equipment for an engineering plastic resin.

In carrying out melt-processing of the polyimide of the invention, other thermoplastic resins can also be added in a suitable amount depending upon the object of the invention and as long as the objects of the invention are not impaired.

Exemplary thermoplastic resins which can be used include, polyethylene, polypropylene, polycarbonate, polyarylate, polyamide, polysulfone, polyether sulfone, polyether ether ketone, polyether ketone, polyphenylene sulfide, polyamideimide, polyetherimide and modified polyphenylene oxide.

Fillers which are commonly used for thermoplastic resin compositions can also be used as long as there is no substantial adverse effects on the objects of the invention. Exemplary fillers include, graphite, carborundum, silica powder, molybdenum disulfide, fluoro resins and other abrasion resistance improvers; glass fibers, carbon fibers, boron fibers, silicon carbide base fibers, carbon whiskers, asbestos, metallic fibers, ceramic fibers and other reinforcements; antimony trioxide, magnesium carbonate, calcium carbonate and other flame retardants; clay, mica and other electrical property improvers; asbestos, silica, graphite and other tracking resistance improvers; barium sulfate, silica, calcium metasilicate and other acid resistance improvers; iron powder, zinc powder, aluminum powder, copper powder and other thermal conductivity improvers; and other miscellaneous materials such as glass beads, glass spheres, talc, diatomaceous earth, alumina, silicate balloons, hydrated alumina, metal oxides and coloring materials.

The present invention will hereinafter be illustrated further in detail by way of examples and comparative examples.

Physical properties in the examples and comparative examples were measured by the following method.

Tg, Tc, Tm : Measured by DSC(Shimadzu DT-40, Series DSC-41M)

5% Weight loss temperature : Measured by DTG(Shimadzu DT-40, Series DTG-40M) in air Melt viscosity : Measured with Shimadzu-Koka Type Flow Tester CFT 500A under 100 kg load

EXAMPLE 1

To a reaction vessel equipped with a stirrer, reflux condenser, water separator and nitrogen inlet tube, 120.0 g (0.6 mole) of 4,4'-diaminodiphenyl ether, 176.7 g (0.57 mole) of 3,3',4,4'-diphenylethertetracarboxylic dianhydride, 8.88 g (0.06 mole) of phthalic anhydride, 8.4 g of γ-picoline and 1200 g of m cresol were charged. The mixture was heated to 145° C. with stirring in a nitrogen atmosphere while distilling out about 20 cc of water and further reacted for 4 hours at 140 to 150° C. The reaction mixture was cooled to room temperature and poured into about 10 l of methyl ethyl ketone. Precipitated polyimide powder was filtered, washed with methyl ethyl ketone and dried at 180° C. for 24 hours under reduced pressure to obtain 280.3 g (98.7% yield) of polyimide powder having an inherent viscosity of 0.52 dl/g.

The inherent viscosity was measured at 35° C. in a solution obtained by heat-dissolving 0.50 g of the polyimide powder in 100 ml of a solvent mixture of p-chlorophenol/phenol (9/1 by weight). The polyimide powder had a glass transition temperature of 245° C. and a 5% weight loss temperature of 550° C. in air.

The IR absorption spectrum of the polyimide powder is illustrated in FIG. 1. In the spectrum, characteristic absorption bands of imide near 1780 cm$^{-1}$ and 1720 cm$^{-1}$, and characteristic absorption band of ether linkage near 1240 cm$^{-1}$ were clearly found.

The following results were obtained in elemental analysis of the polyimide powder thus obtained.

| Elemental analysis | C | N | H |
|---|---|---|---|
| Calculated (%) | 70.99 | 5.92 | 2.98 |
| Found (%) | 70.87 | 5.90 | 2.94 |

The polyimide powder was insoluble in halogenated hydrocarbon solvents such as methylene chloride and chloroform.

The melt viscosity of the polyimide powder thus obtained was measured with a Koka type flow tester under 100 kg load by using an orifice having a diameter of 0.1 cm and a length of 1 cm. The melt viscosity was 5600 poise at 400° C. The strand obtained was light yellow and flexible.

Figure 2:
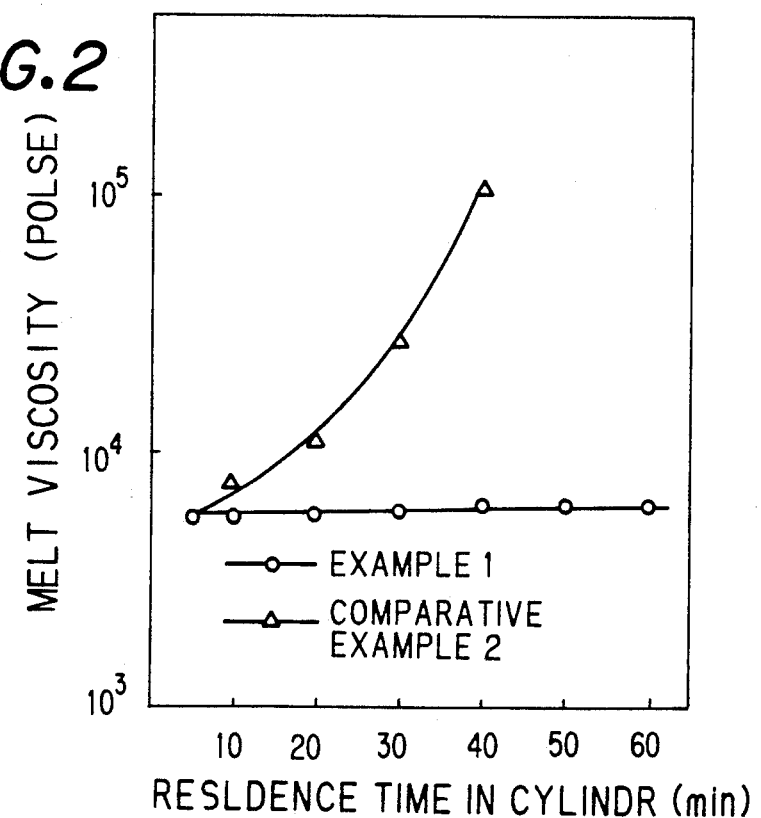
FIGS. 2 and 8 illustrate results obtained by changing the retention time in the cylinder of a flow-tester in order to compare processing stability of polyimide ob-

The processing stability of the polyimide thus obtained was evaluated by measuring the melt viscosity when retention time is changed at 400° C. under 100 kg load. Results are illustrated in FIG. 2. The melt viscosity was almost constant even though retention time is extended. Thus heat stability was good.

Comparative Example 1

To the same reaction vessel used in Example 1, 120.0 g (0.6 mole) of 4,4'-diaminodiphenylether, 124.26 g (0 57 mole) of pyromellitic dianhydride, 8.88 g (0.06 mole) of phthalic anhydride and 980 g of m-cresol were charged.

The same procedures as described in Example 1 were carried out to obtain 229 g (99.0 % yield) of polyimide powder.

The polyimide powder had no distinct glass transition temperature and exhibited no melt flowability at all at 400° C.

Comparative Example 2

Polyimide powder was prepared by carrying out the same procedures as described in Example 1 without using phthalic anhydride.

The polyimide powder had a glass transition temperature of 246° C. and an inherent viscosity of 0.52 dl/g. The melt viscosity was measured by changing the retention time in the cylinder of the flow tester as described in Example 1. As illustrated in FIG. 2, the melt viscosity was increased with extended retention time. Thus, the heat stability of the polyimide powder thus obtained is inferior to that of the polyimide obtained in Example 1.

Example 2

To the same reaction vessel used in Example 1, 120.0 g (0.6 mole) of 3,4'-diaminodiphenyl ether, 176.7 g (0.57 mole) of 3,3',4,4'-diphenylethertetracarboxylic dianhydride, 8.88 g (0.06 mole) of phthalic anhydride, 8.4 g of γ-picoline and 1200 g of m-cresol were charged. The mixture was heated to 145° C. with stirring in a nitrogen atmosphere while distilling out about 20 cc of water and further reacted for 4 hours at 140 to 150° C. The reaction mixture was cooled to room temperature and poured into about 100 l of methyl ethyl ketone. The precipitate was filtered, and dried at 180° C. for 24 hours under reduced pressure to obtain 279 g (98.2 % yield) of polyimide powder.

The polyimide powder obtained had an inherent viscosity of 0.47 dl/g, glass transition temperature of 225° C., and 5% weight loss temperature of 543° C. in air.

Figure 3:
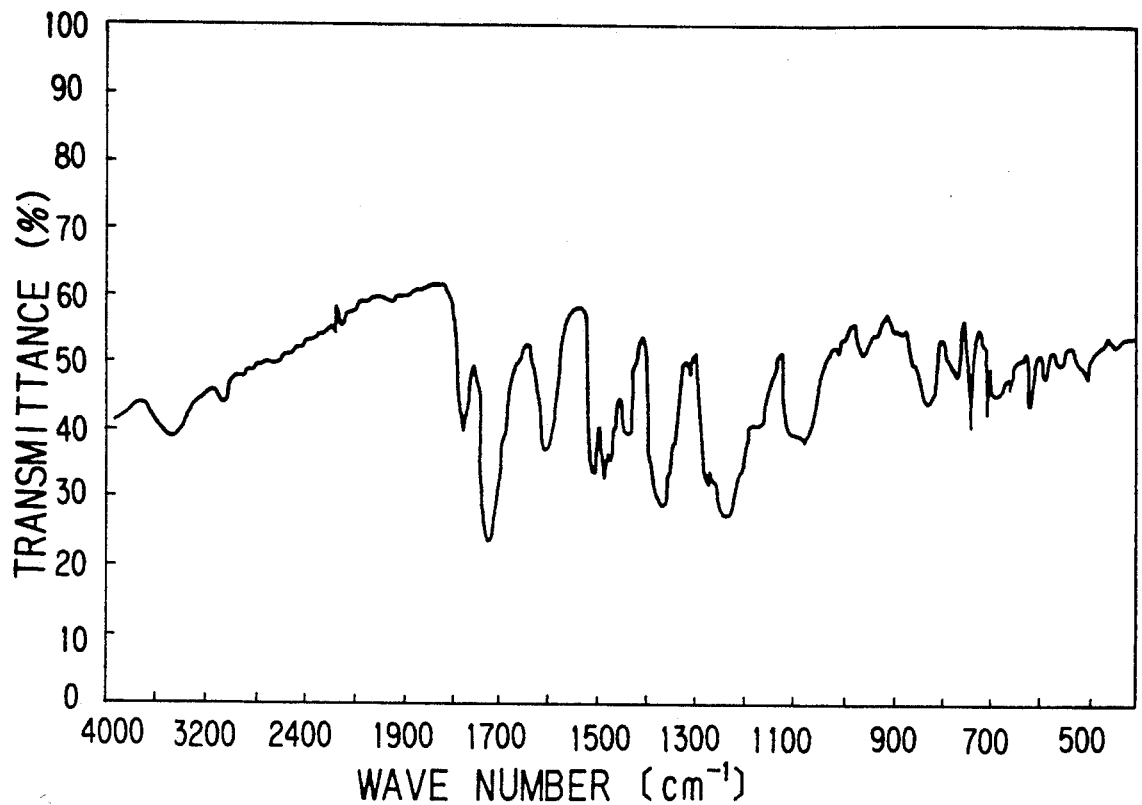

The IR absorption spectrum of the polyimide powder is illustrated in FIG. 3. In the spectrum, characteristic absorption bands imide near 1780 cm$^{-1}$ and 1720 cm$^{-1}$, and characteristic absorption band of ether linkage near 1240 cm$^{-1}$ were clearly found.

The polyimide had a melt viscosity of 3600 poise at 370° C.

Example 3

To the same reaction vessel used in Example 1, 120.0 g (0.6 mole) of 3,4'-diaminodiphenyl ether and 1217 g of N,N'-dimethylacetamide were charged, and 184.1 g (0.594 mole) of 3,3',4,4'-diphenylethertetracarboxylic dianhydride was added by portions at room temperature in a nitrogen atmosphere with caution to prevent a temperature rise of the solution. The resulting mixture was stirred for 20 hours at room temperature and then 1.77 g (0.012 mole) of phthalic anhydride was added and further stirred for 3 hours. The polyamic acid thus obtained had an inherent viscosity of 1.17 dl/g.

The inherent viscosity of the polyamic acid was measured at 35° C. in a N,N-dimethylacetamide solution containing 0.5 g of the polyamic acid in 100 ml of the solvent.

A portion of the polyamic acid solution was cast on a glass plate and heated at 100° C., 200° C. and 300° C. for respectively an hour to obtain a polyimide film having a thickness of about 50 μm.

The polyimide film had a tensile strength of 15.3 kg/mm$^2$, tensile modulus of 344 kg/mm$^2$ and elongation of 7.8% in accordance with ASTM D-822. The polyimide film also had a glass transition temperature of 235° C. by TMA penetration method.

Example 4

The same procedure as described in Example 3 were carried out by using the same reaction vessel used in example 1 except that 3,4'-diaminodiphenyl ether is replaced by 3,3'-diaminodiphenyl ether. The polyamic acid solution thus obtained had an inherent viscosity of 0.92 dl /g.

The procedures described in Example 3 were repeated by using the polyamic acid thus obtained to prepare a polyimide film having a thickness of 50 μm.

The polyimide film had glass transmition temperature of 215° C. by TMA penetration method.

Example 5

To the same reaction vessel as used in Example 1, 120.0 g (0.6 mole) of 4,4'-diaminodiphenyl ether, 231.6 g (0.57 mole) of 4,4'-(p-phenylenedioxy)dipthalic dianhydride, 7.10 g (0.048 mole) of phthalic anhydride, 8.4 g of γ-picoline and 1435 g of m-cresol were charged. The mixture was heated to 145° C. with stirring in a nitrogen atmosphere while distilling out about 20 cc of water and further reacted at 140 to 150° C. for 4 hours. The reaction mixture was then cooled to room temperature and poured into about 10 l of methyl ethyl ketone. Precipitated polyimide powder was filtered, washed with methyl ethyl ketone and dried at 180° C. for 24 hours under reduced pressure to obtain 332.0 g (98.5% yield) of polyimide powder having an inherent viscosity of 0.69 dl/g.

The inherent viscosity was measured at 35° C. in a solution obtained by heat-dissolving 0.50 g of the polyimide powder in 100 ml of a solvent mixture of p-chorophenol/phenol (9/1 by weight). The polyimide powder had a glass transition temperature of 228° C. and a 5% weight loss temperature of 548° C. in air.

Figure 4:
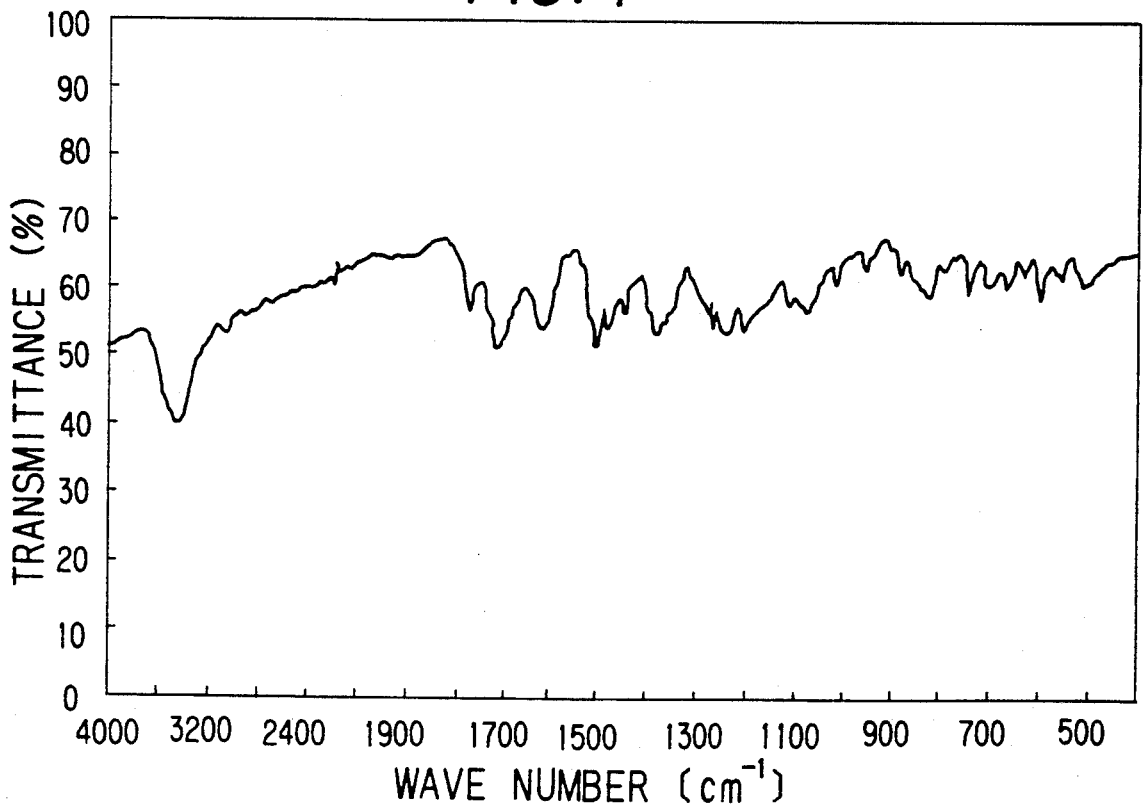

The IR absorption spectrum of the polyimide powder is illustrated in FIG. 4. In the spectrum, characteristic absorption bands of imide near 1780 cm$^{-1}$ and 1720 cm$^{-1}$, and characteristic absorption band of ether linkage near 1240 cm$^{-1}$ were clear observed.

Following results were obtained in elemental analysis of the polyimide powder thus obtained.

| Elemental analysis | C | N | H |
| --- | --- | --- | --- |
| Calculated (%) | 72.11 | 4.98 | 3.19 |
| Found (%) | 72.05 | 4.99 | 3.14 |

The polyimide powder was insoluble in chlorinated hydrocarbon solvents such as methylene chloride and chloroform.

Melt viscosity of the polyimide powder thus obtained was measured with a Koka type flow tester under 100 kg load by using an orifice having a diameter of 0.1 cm and a length of 1 cm. The melt viscosity was 8600 poise at 380° C. The strand obtained was light yellow and flexible.

Processing stability of the polyimide powder thus obtained was evaluated by measuring the melt viscosity when the retention time is changed in the cylinder of the flow tester at 380° C. under 100 kg load. Melt viscosity was almost constant even though retention time in the cylinder was extended. Thus heat stability of the polyimide powder was good.

Comparative Example 3

Polyimide powder was prepared by carrying out the same procedures as described in Example 5 except that phthalic anhydride was omitted.

The polyimide powder thus obtained had a glass transition temperature of 229° C. and an inherent viscosity of 0.69 dl/g. Melt viscosity of the polyimide powder was measured by changing the retention time in the cylinder as conducted in Example 5. Melt viscosity was increased with extended retention time. Thus, heat stability of the polyimide powder thus obtained was inferior to that of the polyimide powder obtained in Example 5.

Example 6

To the same reaction vessel used in Example 1, 120.0 g (0.6 mole) of 3,4'-diminodiphenyl ether, 231.6 g (0.576 mole) of 4,4'(p-phenylenedioxy)diphthalic dianhydride, 7.10 g (0.048 mole) of phthalic anhydride, 8.4 g of γ-picoline and 1435 g of m-cresol were charged. The mixture was heated to 145° C. with stirring in a nitrogen atmosphere while distilling out about 20 cc of water. The mixture was further reacted at 140 to 150° C. for 4 hours, and thereafter cooled to the room temperature and poured into about 10 l of methyl ethyl ketone.

The precipitate thus obtained was filtered and dried at 180° C. for 24 hours under reduced pressure to obtain 333 g (98% yield) of polyimide powder. The polyimide powder had an inherent viscosity of 0.61 l/g, a glass transition temperature of 208° C., and a 5% weight loss temperature of 545° C. in air.

Following results were obtained in elemental analysis of the polyimide powder thus obtained.

| Elemental analysis | C | N | H |
|---|---|---|---|
| Calculated (%) | 72.11 | 4.98 | 3.19 |
| Found (%) | 72.07 | 4.96 | 3.18 |

Melt viscosity of the polyimide powder was 3900 poise at 370° C. The strand obtained was light yellow flexible and tough.

Example 7

The same reaction vessel as described in Example 1 was used. Polyimide powder was obtained by carrying out the same procedures as described in Example 5 except that 4,4'-diaminodiphenyl ether was replaced by 3,3'-diaminodiphenyl ether. The polyimide powder obtained had an inherent viscosity of 0.57 l/g, a glass transition temperature of 196° C. and a 5% weight loss temperature of 539° C.

Following results were obtained in elemental analysis of the polyimide powder thus obtained.

| Elemental analysis | C | N | H |
|---|---|---|---|
| Calculated (%) | 72.11 | 4.98 | 3.19 |
| Found (%) | 72.10 | 4.92 | 3.20 |

The polyimide powder had melt viscosity of 4100 poise at 350° C. The strand obtained was colorless, transparent, flexible and tough.

Example 8

To the same reaction vessel used in Example 1, 120.0 g (0.6 mole) of 3,3'-diaminodiphenyl ether and 1076 g of N,N-dimethylacetamide were charged, and 238.8 g (0.594 mole) of 4,4'-(p-phenylenedioxy)diphthalic dianhydride was added by portions at room temperature in a nitrogen atmosphere with caution to prevent temperature rise of the solution. The resulting mixture was stirred for 20 hours at room temperature and then 1.77 g (0.012 mole) of phthalic anhydride was added and further stirred for 3 hours. The polyamic acid thus obtained had an inherent viscosity of 0.98 l/g.

The inherent viscosity of the polyamic acid was measured at 35° C. in a N,N-dimethylacetamide solution containing 0.5 g of the polyamic acid in 100 ml of the solvent.

A portion of the polyamic acid solution was cast on a glass plate and heated at 100° C., 200° C. and 300° C. for respectively an hour to obtain a polyimide film having a thickness of about 50 μm.

The polyimide film had a total light transmittance of 87.5% and haze of 0.5% in accordance with ASTM D-1003.

Example 9

To the same reaction vessel as used in Example 1, 146.0 g (0.5 mole) of 1,4-bis(4-aminophenoxy)benzene, 147.25 g (0.475 mole) of 3,3',4,4'-diphenylethertetracarboxylic dianhydride, 7.40 g (0.05 mole) of phthalic anhydride, 7.0 g of γ-picoline and 1170 g of m cresol were charged. The mixture was heated to 145° C. with stirring in a nitrogen atmosphere while distilling out about 18 cc of water and further reacted at 140 to 150° C. for 4 hours. The reaction mixture was then cooled to room temperature and poured into about 10 l of methyl ethyl ketone. Precipitated polyimide powder was filtered, washed with methyl ethyl ketone and dried at 180° C. for 24 hours under reduced pressure to obtain 279.3 g (98.8% yield) of polyimide powder having an inherent viscosity of 0.50 l/g.

The inherent viscosity was measured at 35° C. in a solution obtained by heat-dissolving 0.50 g of the polyimide powder in 100 ml of a solvent mixture of p-chorophenol/phenol (9/1 by weight). The polyimide powder had a glass transition temperature of 222° C., crystallization temperature (Tc) of 324° C., crystal melting temperature (Tm) of 428° C., and 5% weight loss temperature of 535° C. in air.

Figure 5:
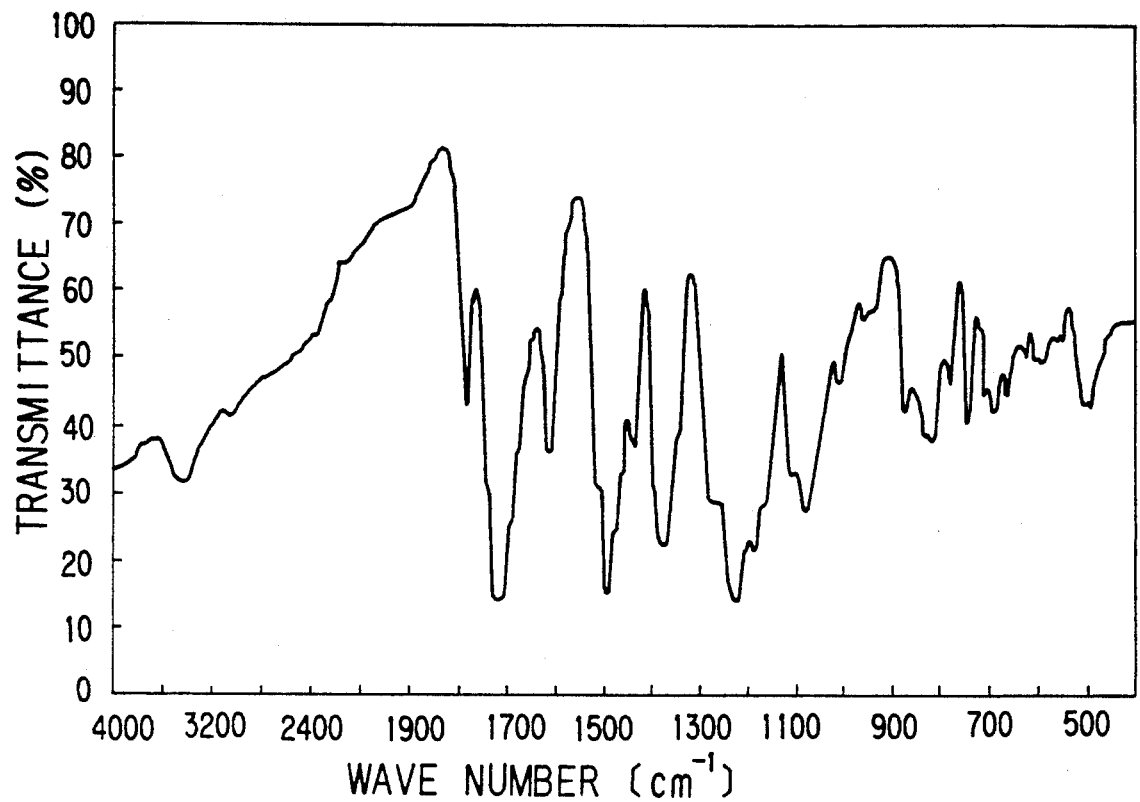

The IR absorption spectrum of the polyimide powder is illustrated in FIG. 5. In the spectrum, characteristic absorption bands of imide near 1780cm$^{-1}$ and 1720 cm$^{-1}$, and characteristic absorption band of ether linkage near 1240 cm$^{-1}$ were clearly observed.

Following results were obtained in elemental analysis of the polyimide powder thus obtained.

| Elemental analysis | C | N | H |
|---|---|---|---|
| Calculated (%) | 72.17 | 4.95 | 3.20 |
| Found (%) | 72.14 | 4.96 | 3.16 |

The polyimide powder was insoluble in chlorinated hydrocarbon such as methylene chloride and chloroform.

Melt viscosity of the polyimide powder thus obtained was measured with a Koka type flow tester under 100 kg load by using an orifice having a diameter of 0.1 cm and a length of 1 cm. The melt viscosity was 9000 poise at 45° C. The strand obtained was light yellow and flexible.

Comparative Example 4

To the same reaction vessel used in Example 1, 146.0 g (0.5 mole) of 1,4-bis(4-aminophenoxy)benzene, 103.55 g (0.475 mole) of pyromellitic dianhydride, 7.4 g (0.05 mole) of phthalic anhydride, 7.0 g of γ-picoline and 1000 g of m cresol were charged. The same procedures as described in Example 9 were carried out to obtain 237.0 g (99.2% yield) of polyimide powder.

The polyimide thus obtained had no distinct glass transition temperature and exhibited no melt-flowability at all at 450° C.

Example 10

The same procedures as described in Example 9 were carried out except that 1,4 bis(4-aminophenoxy)benzene was replaced by 1,3-bis(4-aminophenoxy)benzene.

Polyimide powder thus obtained was 278.5 g (98.5% yield) and had an inherent viscosity of 0.50 dl/g, Tg of 205° C., and a 5% weight loss temperature of 540° C. in air.

Figure 6:
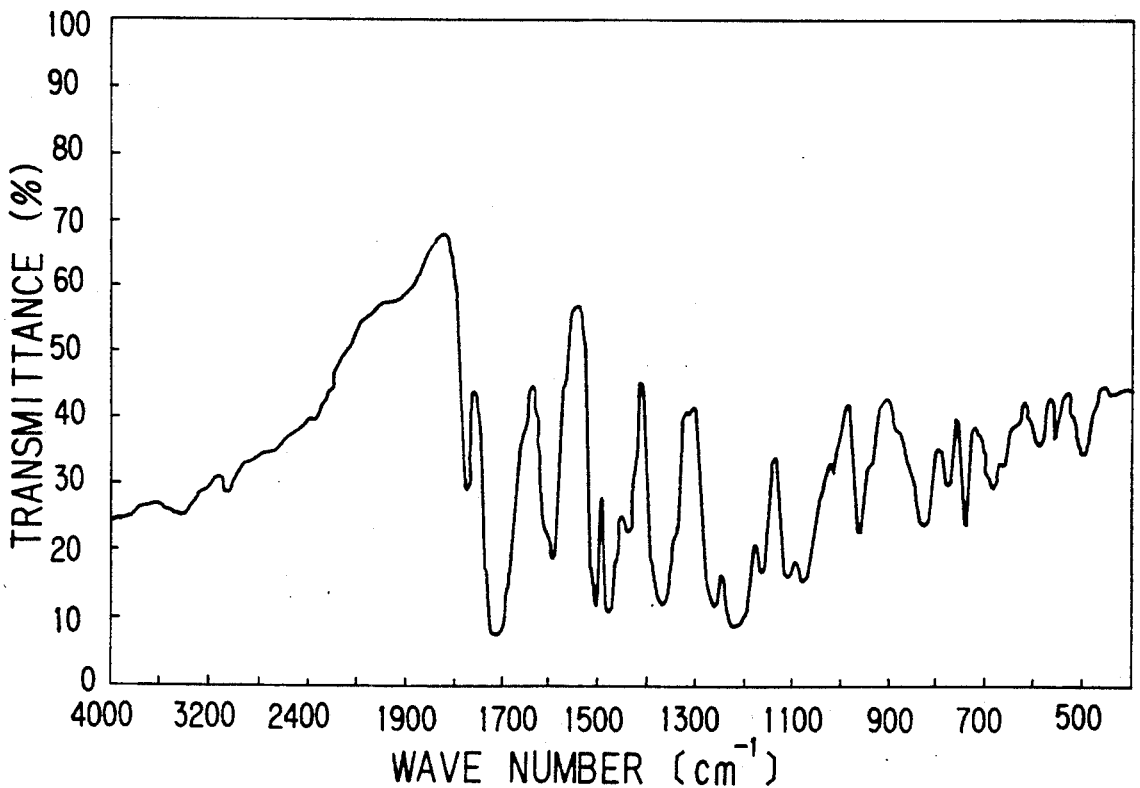

The IR absorption spectrum of the polyimide powder thus obtained is illustrated in FIG. 6. In the spectrum, characteristic absorption bands of imide near 1780 $cm^{-1}$ and 1720 $cm^{-1}$, and characteristic absorption band of ether linkage near 1240 $cm^{-1}$ were clearly found.

Following results were obtained in elemental analysis of the polyimide powder obtained.

| Elemental analysis | C | N | H |
|---|---|---|---|
| Calculated (%) | 72.17 | 4.95 | 3.20 |
| Found (%) | 72.15 | 4.92 | 3.18 |

Melt viscosity of the polyimide powder obtained was 1900 poise at 370° C. by a Koka type flow tester. The strand obtained was light yellow and flexible.

Stability of melt viscosity was measured on the polyimide powder obtained by changing retention time in the cylinder of the flow tester at 370° C. Almost no increase was observed on the melt viscosity.

Comparative Example 5

Figure 8:
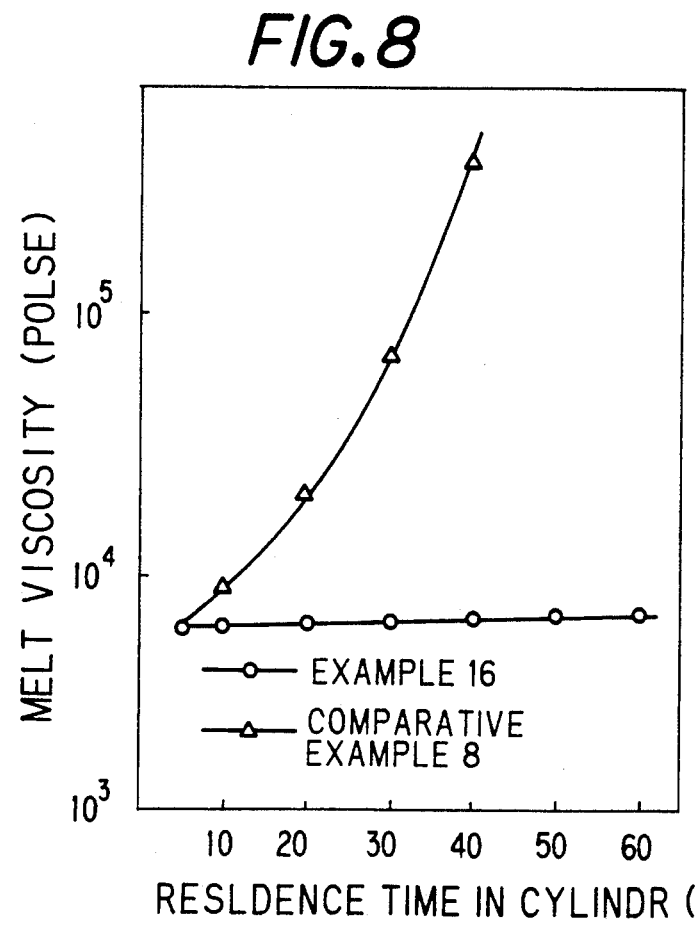

Polyimide powder was prepared by carrying out the same procedures as described in Example 10 except that phthalic anhydride was omitted. The polyimide powder obtained had a glass transition temperature of 204° C. and an inherent viscosity of 0.50 dl/g. Melt viscosity was measured by changing the retention time in the cylinder as conducted in Example 10. As illustrated in FIG. 8, melt viscosity was increased with extended retention time. Thus, heat stability of the polyimide powder thus obtained was inferior to that of the polyimide powder obtained in Example 10.

Example 11

To the same reaction vessel used in Example 1, 146.0 g (0.5 mole) of 1,4-bis(3-aminophenoxy)benzene, 148.8 g (0.486 mole) of 3,3',4,4'-diphenylethertetracarboxylic dianhydride, 5.92 g (0.04 mole) of phthalic anhydride, 7 g of γ-picoline and 1200 g of m-cresol were charged. The mixture was heated to 145° C. with stirring in a nitrogen atmosphere while distilling out about 18 cc of water and further reacted at 140 to 150° C. for 4 hours.

The reaction mixture was then cooled to room temperature and poured into about 10 l of methyl ethyl ketone. Precipitated polyimide powder was filtered, washed with methyl ethyl ketone and dried at 180° C. for 24 hours under reduced pressure to obtain 277 g (98.0 % yield) of polyimide powder.

The polyimide powder obtained had an inherent viscosity of 0.48 dl/g, Tg of 191° C. and a 5% weight loss temperature of 545° C. in air.

Following results were obtained in elemental analysis of the polyimide powder thus obtained.

| Elemental analysis | C | N | H |
|---|---|---|---|
| Calculated (%) | 72.25 | 4.93 | 3.19 |
| Found (%) | 72.23 | 4.91 | 3.17 |

Melt viscosity of the polyimide powder thus obtained was 2800 poise at 340° C. by a Koka type flow tester. The strand obtained was colorless, transparent, flexible and tough.

Example 12

The same reaction vessel as described in Example 1 was used and the same procedures as described in Example 11 were carried out except that 1,4-bis(3-aminophenoxy)benzene was replaced by 1,3-bis(3-aminophenoxy)benzene.

The polyimide powder thus obtained was 278 g (98.2% yield) and had an inherent viscosity of 0.45 1/g, Tg of 172° C. and a 5% weight loss temperature of 540° C. in the air.

Following results were obtained in elemental analysis of the polyimide powder obtained.

| Elemental analysis | C | N | H |
|---|---|---|---|
| Calculated (%) | 72.25 | 4.93 | 3.19 |
| Found (%) | 72.21 | 4.90 | 3.15 |

Melt viscosity of the polyimide powder thus obtained was 4200 poise at 290° C. a Koka type flow tester. The strand obtained was colorless, transparent, flexible and tough.

Example 13

To the same reaction vessel as used in Example 1, 146 g (0.5 mole) of 1,4-bis(4-aminophenoxy)benzene and 1200 g of N,N-dimethylacetamide were charged, and 153.45 g (0.495 mole) of 3,3',4,4'-diphenylethertetracarboxylic dianhydride was added by portions at room temperature in a nitrogen atmosphere with caution to prevent temperature rise of the solution. The resulting mixture was stirred for 20 hours at room temperature and then 1.48 g (0.01 mole) of phthalic anhydride was added and further stirred for 3 hours. The polyamic acid thus obtained had an inherent viscosity of 0.95 dl/g.

The inherent viscosity of the polyamic acid was measured at 35° C. in a N,N-dimethylacetamide solution containing 0.5 g of the polyamic acid in 100 ml of the solvent.

A portion of the polyamic acid solution was cast on a glass plate and heated at 100° C., 200° C. and 300° C. for respectively an hour to obtain a polyimide film having a thickness of about 50 μm.

The polyimide film had a total light transmittance of 86.9% and haze of 0.6 % in accordance with ASTM D-1003.

Example 14

To the same reaction vessel used in Example 1, 175.2 g (0.6 mole) of 1,3-bis(3 aminophenoxy)benzene, 231.6 g (0.57 mole) of 4,4'(p-phenylenedioxy)diphthalic dianhydride, 10.66 g (0.072 mole) of phthalic anhydride, 8.4 g of γ-picoline and 1435 g of m cresol were charged. The mixture was heated to 145° C. with stirring in a nitrogen atmosphere while distilling out about 20 cc of water and further reacted for 4 hours at 140 to 150° C. The reaction mixture was cooled to room temperature and poured into about 10 l of methyl ethyl ketone. The precipitate was filtered, washed with methyl ethyl ketone and dried at 180° C. for 24 hours under reduced pressure to obtain 386.2 g (98.0% yield) of polyimide powder.

The polyimide powder obtained had an inherent viscosity of 0.51 dl/g. The inherent viscosity was measured at 35° C. in a solution obtained by heat-dissolving 0.50 g of the polyimide powder in 100 ml of a solvent mixture of p-chlorophenol/phenol (9/1 by weight). The polyimide powder had a glass transition temperature of 153° C. and a 5% weight loss temperature of 521° C. in air.

The melt viscosity of polyimide powder thus obtained was measured with a Koka type flow tester under 100 g load by using an orifice having a diameter of 0.1 cm and a length of 1 cm. The melt viscosity was 5700 poise at 310° C. The strand obtained was light yellow, transparent and flexible.

Processing stability of the polyimide powder thus obtained was measured by changing retention time in the cylinder of the flow tester at 310° C. under 100 kg load. Melt viscosity was almost constant even though retention time in the cylinder was extended. Thus, heat stability of the polyimide powder was good.

Comparative Example 6

The same procedures as described in Example 14 were carried out without using phthalic anhydride. The polyimide powder thus obtained was 365.9 (97.5% yield), and had a glass transition temperature of 154° C. and an inherent viscosity of 0.51 dl/g.

Melt viscosity of the polyimide powder was measured by changing the retention time in the cylinder as carried out in Example 14. Melt viscosity was increased with extended retention time. Thus, heat stability of the polyimide powder thus obtained was inferior to that of the polyimide powder obtained in Example 14.

Example 15

The same reaction vessel as described in Example 1 was used and the same procedures so described in Example 14 were carried out except that 1,3 bis(3 aminophenoxy)benzene was replaced by 1,3-bis(4-aminophenoxy)benzene.

The polyimide powder thus obtained was 388.2 g (98.5% yield), and had a glass transition temperature cf 180° C. and an inherent viscosity of 0.53 dl/g. The processing stability of the polyimide powder was examined by the same procedures as conducted in Example 14 at 350° C. under 100 kg load. Melt viscosity was almost constant even though retention time in the cylinder was extended. Thus processing stability of the polyimide powder was good.

Comparative Example 7

The same procedures as described in Example 15 were carried out without using phthalic anhydride. The polyimide powder thus obtained was 368.5 g (98.2% yield), and had a glass transition temperature of 180° C. and an inherent viscosity of 0.53 dl/g.

Melt viscosity of the polyimide powder was measured by changing the retention time in the cylinder as carried out in Example 15. Melt viscosity was increased with extended retention time. Thus, heat stability of the polyimide powder thus obtained was inferior to that of the polyimide powder obtained in Example 15.

Example 16

To the same reaction vessel as described in Example 1, 100.0 g (0.5 mole) of 4,4'-diaminodiphenyl ether, 117.8 g (0.38 mole) of 3,3',4,4'-diphenylethertetracarboxylic dianhydride, 20.71 g (0.095 mole) of pyromellitic dianhydride, 7.40 g (0.05 mole) of phthalic anhydride, 7.0 g of γ-picoline and 985 g of m-cresol were charged. The mixture was heated to 145° C. with stirring in a nitrogen atmosphere while distilling out about 18 cc of water and further reacted at 140 to 150° C. for 4 hours.

The reaction mixture was then cooled to room temperature and poured into about 10 l of methyl ethyl ketone. Precipitated powder was filtered, washed with methyl ethyl ketone and dried at 180° C. for 4 hours under reduced pressure to obtain 224.5 g (98.5% yield) of polyimide powder having an inherent viscosity of 0.51 dl/g.

The inherent viscosity was measured at 35° C. in a solution obtained by heat-dissolving 0.50 g of the polyimide powder in 100 ml of a solvent mixture of p chlorophenol/phenol(9/1 by weight). The polyimide powder had a glass transition temperature of 255° C. and a weight loss temperature of 555° C.

Figure 7:
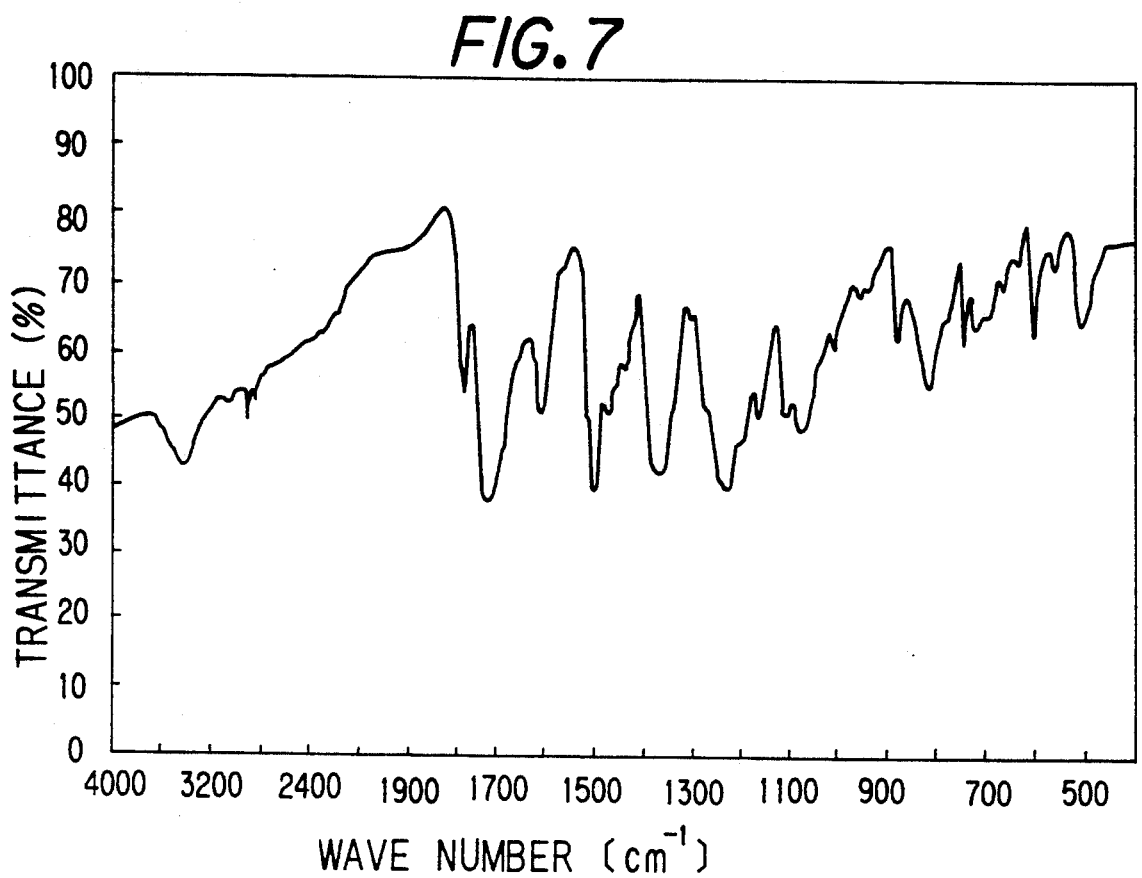

The IR absorption spectrum of the polyimide powder is illustrated in FIG. 7. In the spectrum, characteristic absorption bands of imide near 1780 cm$^{-1}$ and 1720 cm$^{-1}$ and characteristic absorption band of ether linkage near 1240 cm$^{-1}$ were clearly observed.

Following results were obtained in elemental analysis of the polyimide powder thus obtained.

| Elemental analysis | C | N | H |
|---|---|---|---|
| Calculated (%) | 70.71 | 6.14 | 2.93 |
| Found (%) | 70.68 | 6.15 | 2.91 |

The polyimide powder was insoluble in chlorinated hydrocarbon solvents such as methylene chloride and chloroform.

Melt viscosity of the polyimide powder thus obtained was measured with a Koka type flow tester under 100 kg load by using an orifice having a diameter of 0.1 cm and a length of 1 cm. The melt viscosity was 6400 poise at 400° C. The strand thus obtained was light yellow, transparent and flexible.

Processing stability of the polyimide powder thus obtained was measured by changing retention time in the cylinder of the flow tester at 400° C. under 100 kg load. As results are illustrated in FIG. 8. Melt viscosity was almost constant even though retention time in the cylinder was extended. Thus, heat stability of the polyimide powder was good.

Comparative Example 8

Polyimide powder was prepared by carrying out the same procedures as described in Example 16 without using phthalic anhydride. The polyimide powder had a glass transition temperature of 265° C. and an inherent viscosity of 0.51 dl/g.

Melt viscosity of the polyimide powder was measured by changing the retention time in the cylinder of the flow tester as carried out in Example 16. As illustrated in FIG. 8, melt viscosity was increased with extended retention time. Thus, heat stability of the polyimide powder thus obtained was inferior to that of the polyimide powder obtained in Example 16.

Examples 17-19 and Comparative Examples 9-10

Polyimide powder was prepared by the same procedures as in Example 16 except that mole ratio of 3,3',4,4'-diphenylethertetracarboxylic dianhydride to pyromellitic dianhydride was changed. The inherent viscosity, glass transition temperature and melt viscosity at 400° C. are summarized in Table 1 together with those obtained in Comparative Examples.

Example 20

To the same reaction vessel as used in Example 1, 120.0 g (0.600 mole) of 3,4'-diaminodiphenyl ether, 141 36 g (0.456 mole) of 3,3',4,4'-diphenylethertetracarboxylic dianhydride, 24.85 g (0 114 mole) of pyromellitic dianhydride, 8.88 g (0.06 mole) of phthalic anhydride, 8.4 g of γ-picoline and 1180 g of m-cresol were charged. The mixture was heated to 145° C. with stirring in a nitrogen atmosphere while distilling out 21 cc of water and further reacted for 4 hours at 140 to 150° C. The reaction mixture was then cooled to room temperature and poured into about 10 l of methyl ethyl ketone. The precipitated polyimide was filtered, washed with methyl ethyl ketone and dried at 180° C. for 24 hours under reduced pressure to obtain 269.4 g (98.5% yield) of polyimide powder.

The polyimide powder thus obtained had an inherent viscosity of 0.49 dl/g. The inherent viscosity was measured at 35° C. in a solution obtained by heat dissolving 0.50 g of the polyimide powder in 100 ml of a solvent mixture of p-chlorophenol/phenol (9/1 by weight). The polyimide powder had a glass transition temperature of 237° C. and a 5 % weight loss temperature of 558° C.

Figure 9:
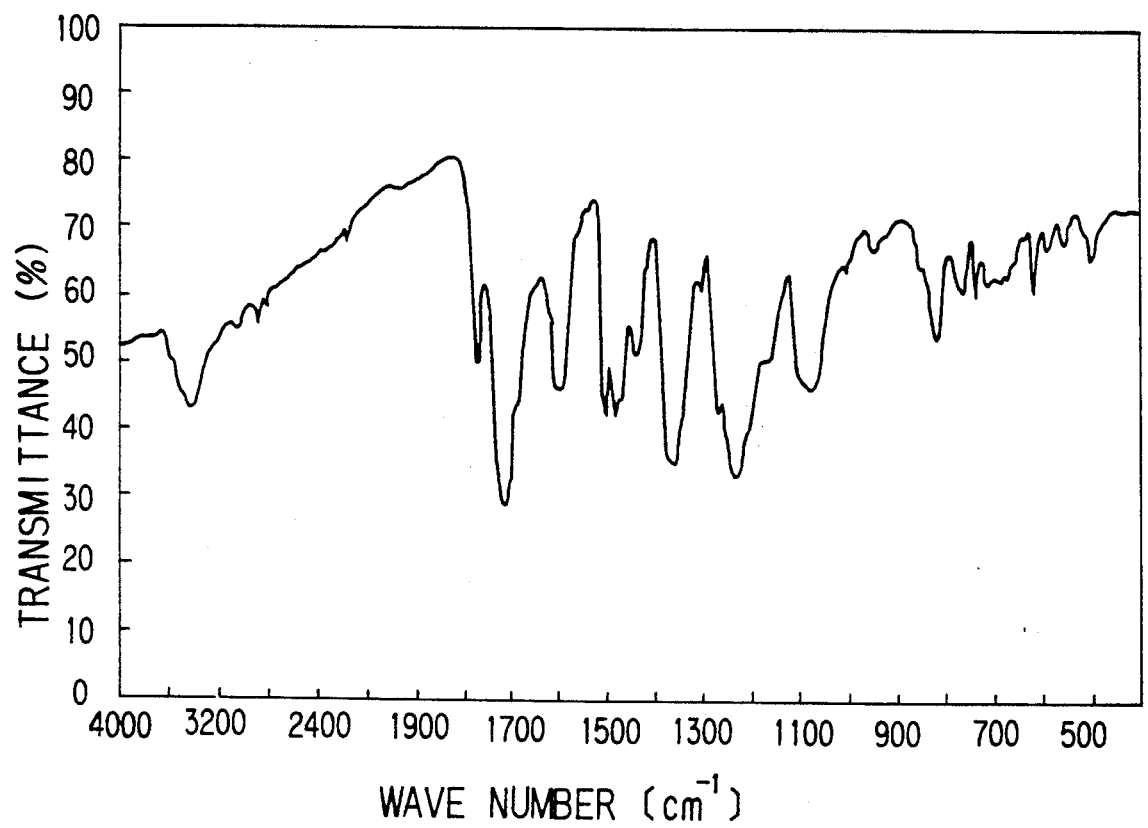

The IR absorption spectrum of the polyimide powder is illustrated in FIG. 9. In the spectrum, characteristic absorption bands of imide near 1780 cm$^{-1}$ and 1720 cm$^{-1}$ and characteristic absorption band of ether linkage near 1240 cm$^{-1}$ were clearly observed.

Following results were obtained in elemental analysis of the polyimide powder thus obtained.

| Elemental analysis | C | N | H |
|---|---|---|---|
| Calculated (%) | 70.71 | 6.14 | 2.93 |
| Found (%) | 70.66 | 6.13 | 2.89 |

The polyimide powder was insoluble in halogenated hydrocarbon solvent such as methylene chloride and chloroform.

Melt viscosity of the polyimide powder thus obtained was measured with a Koka type flow tester under 100 kg load by using an orifice having a diameter of 0.1 cm and a length of 1 cm. The melt viscosity was 4100 poise at 370° C. The strand obtained was light yellow, transparent and flexible.

Processing stability of the polyimide powder thus obtained was measured by changing the retention time in the cylinder of the flow tester at 390° C. under 100 kg load. Melt viscosity was almost constant even though retention time in the cylinder was extended. Thus, heat stability of the polyimide powder was good.

Comparative Example 11

To the same reaction vessel used in Example 1, 120.0 g (0.6 mole) of 3,4'-diaminodiphenyl ether, 124.26 g (0.57 mole) of pyromellitic dianhydride, 8.88 g (0.06 mole) of phthalic anhydride, 8.4 g of γ-picoline and 980 g of m-cresol were charged. The same procedures as described in Example 20 were carried out to obtain 226.7 g (98.0% yield) of polyimide powder. The polyimide powder obtained had no distinct glass transition temperature and also exhibited no melt flowability at all at 380° C. and 450° C.

Examples 21-23 and Comparative Examples 12-13

Polyimide powder was obtained by carrying out the same procedures as described in Example 20 except that the mole ratio of 3,3',4,4'-diphenylethertetracarboxylic dianhydride to pyromellitic dianhydride was changed. The inherent viscosity, glass transition temperature and melt viscosity at 390° C. of the polyimide powder obtained are summarized in Table 2 together with these of Comparative Examples.

Comparative Examples 14

Marketed KAPTON 200 H (Trademark of E. I. Du Pont de Nemours & Co.) was measured by the same procedures as Example 8 to obtain a total light transmittance of 49.0% and haze of 1.3%.

Comparative Examples 15

Pellets of marketed ULTEM 1000 (Trademark of General Electric Co.) was dissolved in methylene chloride to a concentration of 20% by weight.

TABLE 1

| | 3,4'-Diamino-diphenyl ether g (mole) | Tetracarboxylic acid dianhydride | | PMDA/ODPA mole ratio |
|---|---|---|---|---|
| | | ODPA*1 g (mole) | PMDA*2 g (mole) | |
| Example 16 | 100.0 (0.5) | 117.8 (0.38) | 20.71 (0.095) | 0.25 |
| Example 17 | ↑ | 132.53 | 20.71 (0.095) | 0.11 |
| Example 18 | ↑ | 103.1 (0.3325) | 31.07 (0.1425) | 0.43 |
| Example 19 | ↑ | 80.99 (0.2613) | 46.60 (0.214) | 0.82 |
| Comparative | 120.0 | 141.4 | 4.142 | 0.042 |

TABLE 1-continued

| | | | | |
|---|---|---|---|---|
| Example 9 | (0.6) | (0.456) | (0.019) | |
| Comparative Example 10 | 100.0 (0.5) | 44.18 (0.1425) | 72.49 (0.3325) | 2.3 |

| | Yield (%) | Inherent viscosity ($\eta$) (dl/g) | Glass transition temperature (Tg) (°C.) | Melt viscosity 400° C. × 100 kg load (× $10^4$ poise) |
|---|---|---|---|---|
| Example 16 | 98.5 | 0.51 | 255 | 0.64 |
| Example 17 | 98.7 | 0.52 | 251 | 0/58 |
| Example 18 | 98.4 | 0.51 | 258 | 0.95 |
| Example 19 | 99.0 | 0.53 | 265 | 10.20 |
| Comparative Example 9 | 98.6 | 0.51 | 246 | 0.50 |
| Comparative Example 10 | 99.0 | *3 | vague | no flow |

Note:
*1 3,3',4,4'-Diphenylethertetracarboxylic dianhydride.
*2 Pyromellitic dianhydride.
*3 Does not completely dissolve in the solvent for measuring inherent viscosity.

TABLE 2

| | 3,4'-Diaminodiphenyl ether g (mole) | Tetracarboxylic acid dianhydride | | PMDA/ODPA mole ratio |
|---|---|---|---|---|
| | | ODPA*1 g (mole) | PMDA*2 g (mole) | |
| Example 20 | 120.0 (0.6) | 141.36 (0.456) | 24.85 (0.114) | 0.25 |
| Example 21 | ↑ | 159.03 (0.513) | 12.43 (0.057) | 0.11 |
| Example 22 | ↑ | 123.69 (0.399) | 37.28 (0.171) | 0.43 |
| Example 23 | ↑ | 97.19 (0.314) | 55.92 (0.257) | 0.82 |
| Comparative Example 11 | ↑ | 0 | 124.26 (0.57) | — |
| Comparative Example 12 | ↑ | 169.63 (0.547) | 4.97 (0.023) | 0.042 |
| Comparative Example 13 | ↑ | 53.01 (0.717) | 72.49 (0.399) | 2.3 |

| | Yield (%) | Inherent viscosity ($\eta$) (dl/g) | Glass transition temperature (Tg) (°C.) | Melt viscosity 400° C. × 100 kg load (× $10^4$ poise) |
|---|---|---|---|---|
| Example 20 | 98.5 | 0.49 | 237 | 0.41 |
| Example 21 | 98.8 | 0.48 | 235 | 0.39 |
| Example 22 | 98.7 | 0.49 | 240 | 0.56 |
| Example 23 | 99.1 | 0.50 | 243 | 12.10 |
| Comparative Example 11 | 98.0 | *3 | vague | no flow |
| Comparative Example 12 | 98.8 | 0.49 | 226 | 0.35 |
| Comparative Example 13 | 99.0 | *3 | vague | no flow |

Note:
*1 3,3',4,4'-Diphenylethertetracarboxylic dianhydride.
*2 Pyromellitic dianhydride.
*3 Does not completely dissolve in the solvent for measuring inherent viscosity.

What is claimed is:

1. A polyimide obtained by blocking the end of a polymer molecule with a divalent aromatic group derived from phthalic anhydride of the formula (X):

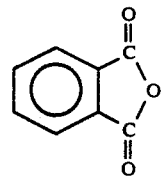

said polymer molecule essentially consisting of a recurring structural unit represented by the formula (II):

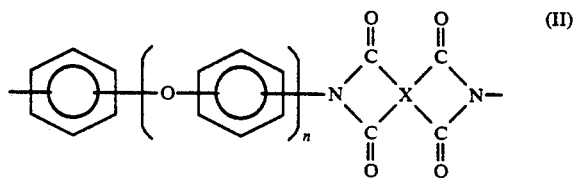

wherein X is a tetravalent group of

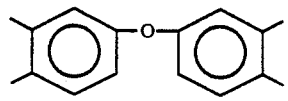 or

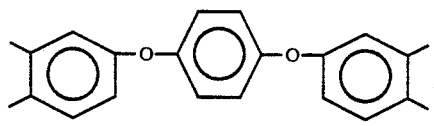

and n is an integer of 1 or 2.

2. A melt-processable polyimide obtained by blocking the end of a polymer molecule with a divalent aromatic group derived from phthalic anhydride of the formula (X):

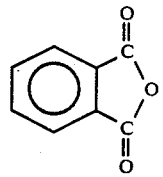

which comprises essentially consisting of 2 or more recurring structural units which are a mixture of a recurring structural unit represented by the formula (III) and/or a recurring structural unit represented by the formula (IV) with a recurring structural unit represented by the formula (V) and/or a recurring structural unit represented by the formula (VI):

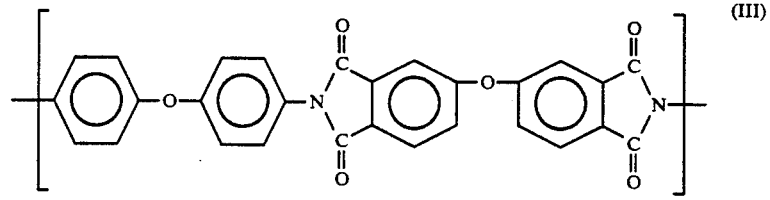

-continued

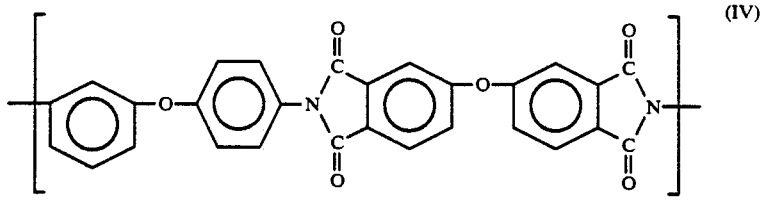

(IV)

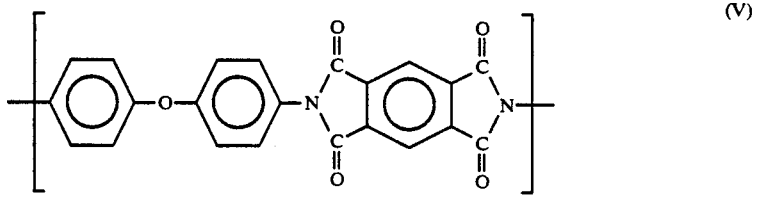

(V)

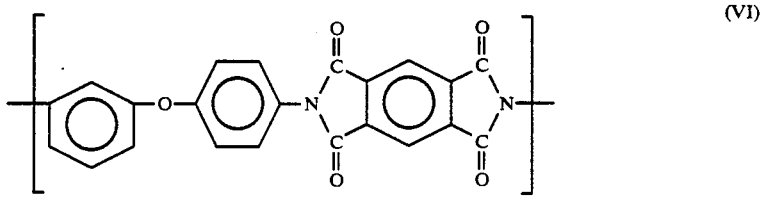

(VI)

3. A process for preparing a readily processable polyimide comprising:
(a) reacting a diamine represented by the formulas (VII)

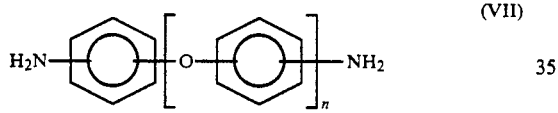

(VII)

wherein n is an integer of 1 or 2 with a tetracarboxylic acid dianhydride selected from 3,3',4,4'-diphenylethertetracarboxylic acid dianhydride and 4,4'-(p-phenylenedioxy)-diphthalic dianhydride in the presence of phthalic anhydride in an amount of from 0.01 to 1.0 mole per mole of the diamine to form a polyamic acid; and
(b) imidizing the polyamic acid to the polyimide.

4. The process of claim 3 wherein n=1 and the tetracarboxylic acid dianhydride is 3,3',4,4'-diphenylethertetracarboxylic acid.

5. The process of claim 3 wherein n=1 and the tetracarboxylic acid dianhydride is 4,4'-(p-phenylenedioxy)-diphthalic dianhydride.

6. The process of claim 3 wherein n=2 and the tetracarboxylic acid dianhydride is 3,3',4,4'-diphenylethertetracarboxylic acid.

7. A process for preparing a readily processable polyimide comprising:
(a) reacting at least one diamine selected from 4,4'-diaminodiphenyl ether and 3,4'-diaminodiphenyl ether with a tetracarboxylic acid dianhydride mixture obtained by mixing pyromellitic dianhydride with 3,3',4,4'-diphenylethertetracarboxylic acid dianhydride and/or 4,4'-(phenylenedioxy)-diphthalic dianhydride, in the presence of phthalic anhydride in an amount of from 0.001 to 1.0 mole per mole of the diamine to form a polyamic acid; and
(b) imidizing the polyamic acid to the polyimide.

8. The process of claim 7 wherein the pyromellitic dianhydride is used in an amount of from 0.05 to 1.0 mole per mole of 3,3',4,4'-diphenylethertetracarboxylic dianhydride and/or 4,4'-(phenylenedioxy)-diphthalic dianhydride.

9. The process of claim 7 wherein the diamine is 4,4'-diaminodiphenyl ether and the tetracarboxylic acid dianhydride is a mixture obtained by mixing pyromellitic dianhydride with 3,3',4,4'-diphenylethertetracarboxylic acid dianhydride.

10. The process of claim 7 wherein the diamine is 3,4'-diaminodiphenyl ether and the tetracarboxylic acid dianhydride is a mixture obtained by mixing pyromellitic dianhydride with 3,3',4,4'-diphenylethertetracarboxylic acid dianhydride.

* * * * *